Aug. 18, 1936. C. C. WICKWIRE 2,051,587
WIRE FABRIC MACHINE
Filed April 4, 1936
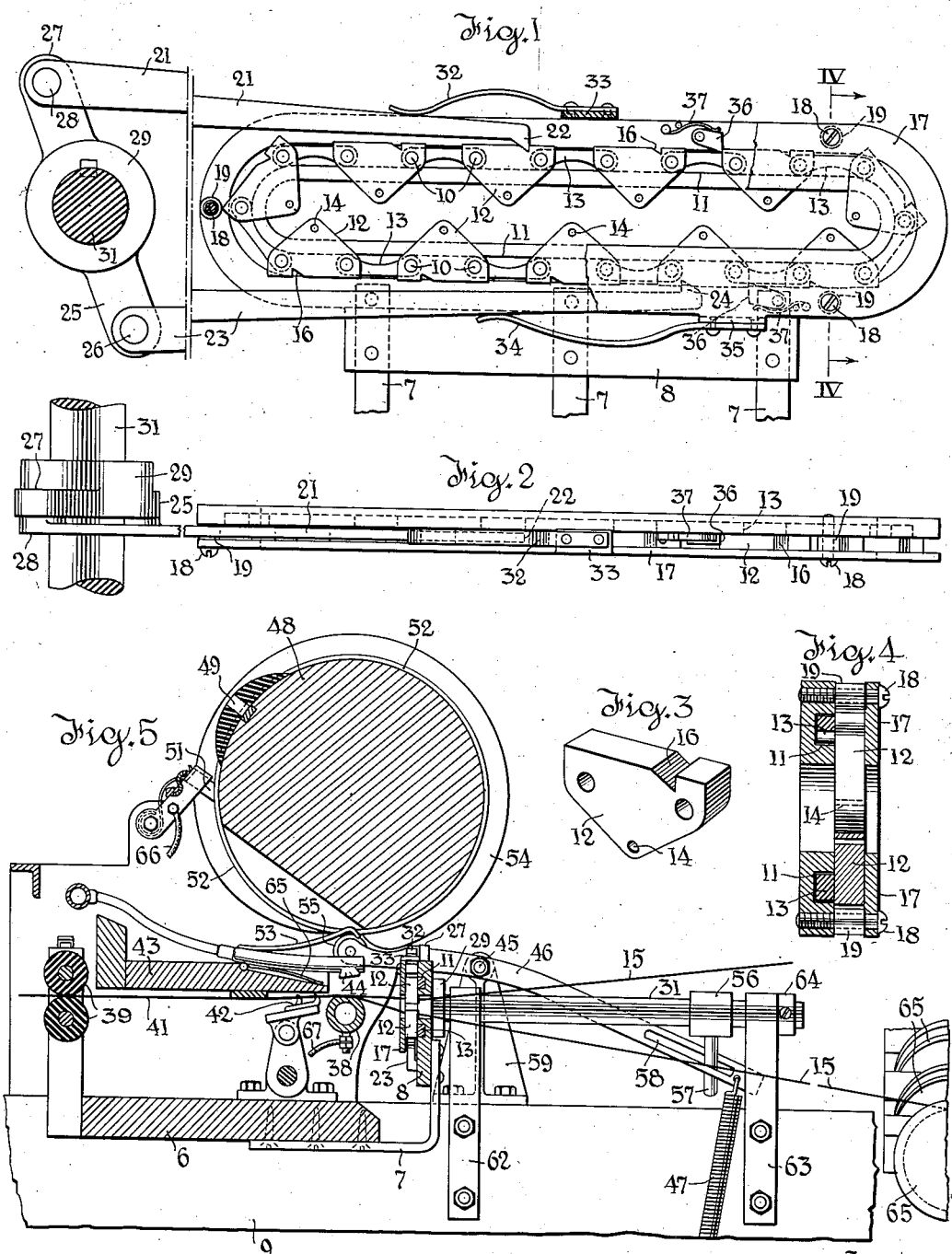

Patented Aug. 18, 1936

2,051,587

UNITED STATES PATENT OFFICE 2,051,587

WIRE FABRIC MACHINE

Charles C. Wickwire, Cortland, N. Y., assignor to Wickwire Brothers, Cortland, N. Y., a corporation of New York Application April 4, 1936, Serial No. 72,782

8 Claims. (Cl. 140—112)

This invention relates to machines for manufacturing welded wire fabrics of the type in which the strands pass diagonally with reference to the length of the fabric, so as to produce a diamond mesh.

More particularly, this invention relates to an improvement in the wire laying mechanism disclosed in the patent to Wickwire 1,911,541 issued May 30, 1933. In the mechanism of that patent the wire strands carried by reels are drawn off intermittently, and are placed in crossed relation on a welding bar by traveling wire carrier elements. A constantly rotating welding roll is so arranged as to bring welding contacts into engagement with the crossed strands which are to be welded together. These strands are held in contact with the welding bar long enough to permit the electric current to produce the desired union between the strands. Inasmuch as the joints are staggered with respect to each other longitudinally, of the fabric, mechanism is provided for periodically shifting the welding fingers laterally of the fabric in timed relation with the operation of the wire feeding means, and the welding mechanism. As the welding operations are carried out, take-up mechanism advances the fabric after each welding step, so that other joints are brought into position on the welding bar, ready for the subsequent welding operation.

The present improvement relates specifically to the wire laying or placing mechanism for bringing the strands into crossed relation over the welding bar ready for the welding operation. Whereas the mechanism disclosed in the above patent for performing this operation consisted of a plurality of wire carrier elements movable about a closed path, these elements were separate from one another and mechanism was required to transfer them from one level to another, from the finishing end of the lower traverse to the beginning end of the upper traverse. In the improved mechanism the various carrier elements form a continuous chain, and are so related to the closed track in which they move as to do away with certain elements which were required in the former structure.

One object of the invention is, therefore, to provide a simplified mechanism capable of more certain operation than devices of the prior art, and at the same time to improve the quality of the fabric being made.

Other objects of the invention will appear from the following specification, when it is read in conjunction with the accompanying drawing in which:

Fig. 1 is a view in elevation of one form of wire laying mechanism and actuating means embodying this invention.

Fig. 2 is a plan view of the mechanism shown in Fig. 1.

Fig. 3 is a detail view of one of the wire carrier elements.

Fig. 4 is a sectional view on the line IV—IV of Fig. 1, and shows the relation of the carrier elements to the track in which they travel.

Fig. 5 is a sectional view showing how the improved mechanism is related to the other essential operating parts of one form of wire fabric machine.

In the drawing, the reference character 6 designates a bed portion of the frame of a wire fabric machine having a side frame 9. On the bed 6 are secured a plurality of upright supporting brackets 7. Attached to and projecting upward from the attaching portions of brackets 7, is a support 8 in the form of a closed ring having a groove or channel 11 cut in one side face. The channel 11 forms a continuous track in the member 8, and it is in this track that the wire carrier elements travel round and round as they lay the wire strands in position to be welded.

Wire carrier elements 12 are connected together by links 13 riveted to them at 10 to form a continuous chain, the links 13 being disposed laterally of the blocks and moving in the track 11. The carrier blocks 12 contain openings 14 to receive the wire strands 15, and serve to carry the strands back and forth across the bed of the machine as the fabric is laid. Each of the carrier blocks contains in its flat face, remote from the location of the openings 14, a notch 16 whereby the carrier elements are actuated. The complete chain is held in its track by a cover or face plate 17 contacting with the lateral faces of the blocks 12, and held in spaced relation to the member 8 by screws 18 and spacer blocks 19.

The mechanism described comprises a continuous closed track in which the chain made up of carrier blocks 12 and links 13, moves intermittently to carry the strands 15 back and forth across the bed of the machine. Actuation of the chain is accomplished by means of two long levers 21 and 23 having actuating dogs, designated 22 and 24, respectively. These actuating dogs are contoured to fit in the notches 16 of carrier blocks 12. Consequently, as the dog 22 moves to the right in Figure 1, the dog 24 moves to the left, causing the blocks to be moved along their track. Lever 21 is pivotally connected to an arm 27 at 28, and lever 23 is pivotally connected to a similar arm 25 at 26. The arms 25 and 27 are attached to a collar 29 keyed to an oscillating shaft 31. The arms 21 and 23 are biased toward the carrier elements 12 by springs 32 and 34 secured to face plate 17 at 33 and 35, respectively.

Consequently, if the shaft 31 is rotated in a clockwise direction, as viewed in Fig. 1, the dogs 22 and 24 engage notches in carrier blocks 12 and cause the chain to travel in a clockwise direction. When the shaft 31 rotates in a counter-clockwise direction, the dogs 22 and 24 ride over the carrier blocks 12 and the links 13, and as the dogs return to their starting positions, the chain is held against travel by locking dogs 36 pivoted on the member 8 and biased into contact with the chain by springs 37.

It will be apparent that as the shaft 31 oscillates, the chain is subjected to intermittent movement in properly timed relation with the other parts of the machine to place the wire strands in position to be welded.

One form of mechanism for imparting oscillating movement to the shaft 31 is shown in Fig. 5 of the drawing. In this figure, the side frame 9 carries in spaced relation, two upright bearing members 62 and 63, the upper portions of which are constructed to provide journals for the shaft 31. The forward end of the shaft 31 carries the collar 29 to which are attached the driving arms 21 and 23, previously described. The rear end of the shaft 31, however, is held against forward movement by a collar 64.

Secured to the shaft 31, slightly forward of the member 63, is a collar 56 carrying a radially projecting pin 57. This pin works in a slot 58 of a rock lever 46 pivoted at 45 on a support 59 bolted to the side frame 9. The rock lever 46 is biased to the position shown in Fig. 5 by a spring 47 attached to its longer end remote from the pivot 45. In the position of the parts, shown in Fig. 5, the driving arms 21 and 23 are biased to one extreme position of travel, substantially that shown in Fig. 1 of the drawing.

Actuation of the rock lever 46 for the purpose of oscillating the shaft 31, is brought about by a cam 54 rotatable with the welding roll 48. The shorter end of rock lever 46 carries a roller 55 which cooperates with cam 54 to actuate the shaft 31 in timed relation to the operation of welding roll 48.

The relation of the present mechanism to the remainder of the machine will be understood by reference to Figure 5, wherein the wire strands 15 from reels 65 are shown as they lead to the carrier blocks 12, and over the welding bar 38. In this figure, reference character 39 designates the take-up rolls for the finished fabric 41. 42 is a feeding member cooperating with the take-up rolls to withdraw the fabric from the welding bar as each welding operation is completed. Lateral movement of the upper welding bar 43 carrying the pivoted welding contacts 44 is brought about at properly timed intervals, and by mechanism which is not essential to the present invention and will not, therefore, be described.

The welding circuit is controlled by the continuously rotating welding roll 48, having a series of insulated contacts 49 mounted on its periphery and supplied with current from one side of a direct current line through brush 51 and a slip ring 52. The two line connections to brush 51 and to welding bar 38 are designated 66 and 67, respectively. The contacts 49 during rotation of the roll strike spring fingers 53 at properly timed intervals so as to depress the welding fingers 44 into contact with the strands as they lie stationary in crossed relation on the welding bar 38. The contact is continued until the welding roll has rotated sufficiently to disengage a contact 49 from its cooperating spring finger 53.

The operation of the complete machine is as follows:

When the welding roll 48 is continuously driven by any suitable mechanism, not shown in the drawing, the welding fingers 44 are displaced laterally in properly timed relation to the operation of roll 48, while the take-up rolls 39 and the feeding mechanism operate to advance the finished fabric through the machine. Rotation of the roll 48 causes the chain of carrier blocks to traverse the track in response to the operation of rock lever 46. Each time that roller 55 is lifted by cam 54, the rock lever is rotated in a counter-clockwise direction about the pivot 45, so as to stretch the spring 47 and thereby lift the actuating pin 57 and rock the shaft 31. When the roll 48 makes a complete rotation from the position shown in Fig. 5, so that the roller 55 again drops into the low point of cam 54, the shaft 31 is rocked in the opposite direction by spring 47. This rocking of shaft 31 actuates the driving arms 21 and 23, previously described, causing the carrier blocks 12 of Fig. 1 to move in a clockwise direction and to bring the wire strands 15 in crossed relation to the welding bar 38. This operation is timed to the operation of the welding contacts 49 on welding roll 48. When each weld is completed, and the contacts 49 move away over their completed joints, the springs 65 underneath the welding fingers 44 cause these fingers to move away from the crossed wires, as the wire feeding mechanism 42 advances the fabric to the left in Fig. 5, and the slack is taken up by the take-up rolls 39.

During the forward movement of the fabric, the rock lever 46 is actuated again to oscillate the shaft 31 and to bring the wires to another crossed position on the welding bar 38.

It will therefore appear that so long as the welding roll 48 is actuated, the wire carrying elements will be periodically advanced to cross the wire strands 15. Since all of the elements 12 are joined positively by links 13, the strands are always maintained in properly spaced relation, and the fabric produced is of uniform character and arrangement. Whereas in prior art devices the wire carrying elements have usually been separate and independent units, the combining of these units to form a continuous chain results in a much improved structure which is not only more accurate and stronger, but simplified and of longer life.

Although the wire carrying mechanism herein shown and described has been disclosed in connection with the wire fabric machine shown in Patent No. 1,911,541, it is obvious that it is not intended to limit the use of this structure to the particular machine illustrated, but rather to give it an interpretation sufficient to cover all similar uses to which it may be put and embraced within the spirit and scope of the invention as defined in the claims.

What is claimed is:

1. In a wire fabric machine of the type in which wire strands are fed intermittently over a welding bar to produce diagonal mesh fabric, a wire carrier mechanism comprising an endless track disposed transversely of the path of travel of the strands; an endless connected series of wire carrier elements movable in said track; and mechanism for imparting intermittent actuation to said elements to cause them to traverse said track.

2. In a machine for making welded wire fabric, a machine bed; welding mechanism on said bed; means for feeding wire strands longitudinally of said bed and through the welding mechanism; and a continuous chain of wire carrier elements movable in a closed path transversely of said bed to lay the strands in crossed relation on said welding bar.

3. A strand laying mechanism for wire fabric machines comprising an endless closed track disposed in a substantially vertical plane; a continuous series of wire carrier elements forming a closed chain fitting into said track; and means for imparting intermittent movement to said chain.

4. A strand laying mechanism for wire fabric machines comprising an endless closed track disposed in a substantially vertical plane; a continuous series of wire carrier elements forming a closed chain fitting into said track; an oscillating shaft; a pair of reciprocating driving dogs actuated by said shaft to actuate said chain; and means for oscillating said shaft to impart intermittent movement to said chain.

5. In a machine for making welded wire fabric, a machine bed; welding mechanism on said bed; means for feeding wire strands longitudinally of said bed and through the welding mechanism; an endless track element disposed transversely of said bed and lying in substantially a vertical plane; a series of wire carrier elements connected together to form an endless chain movable on said track; and means for imparting intermittent movement to said chain.

6. In a machine for making welded wire fabric, a machine bed; welding mechanism on said bed; means for feeding wire strands longitudinally of said bed and through the welding mechanism; an endless track disposed in substantially a vertical plane on said bed, said bed comprising two parallel spaced horizontal runs connected together at their ends by shorter runs; a continuous series of wire carrier elements forming a closed chain movable along said track to carry wire strands across said bed and place strands from said upper run across the corresponding strands of the lower run; and means for imparting intermittent movement to said chain.

7. In a machine for making diagonal mesh wire fabric, a wire laying mechanism made up of an endless chain of wire carrier elements movable about a closed path to place the wire strands in diagonal crossed relation.

8. In a diagonal mesh wire fabric machine, a strand laying mechanism made up of an endless chain of wire carrier elements movable intermittently about a closed path to place the wire strands in intersecting relation; and means for welding the intersecting strands together as they pass a given point beyond the wire strand laying mechanism.

CHARLES C. WICKWIRE.